United States Patent

Kawabe et al.

[11] 4,095,269
[45] June 13, 1978

[54] DATA PROCESSING SYSTEM HAVING A HIGH SPEED BUFFER MEMORY

[75] Inventors: Shun Kawabe, Hino; Kouichiro Omoda, Kokubunji, both of Japan

[73] Assignee: Hitachi, Ltd., Japan

[21] Appl. No.: 728,625

[22] Filed: Oct. 1, 1976

[30] Foreign Application Priority Data

Oct. 1, 1975 Japan .................. 50-117732

[51] Int. Cl.² .................. G06F 13/00
[52] U.S. Cl. .................. 364/200
[58] Field of Search .................. 364/200, 900 MS File

[56] References Cited

U.S. PATENT DOCUMENTS

| | | | |
|---|---|---|---|
| 3,218,611 | 11/1965 | Kilburn | 364/200 |
| 3,297,999 | 1/1967 | Shimabukuro | 364/200 |
| 3,341,817 | 9/1967 | Smeltzer | 364/200 |
| 3,351,909 | 11/1967 | Hummel | 364/200 |
| 3,701,977 | 10/1972 | Mendelson | 364/200 |
| 3,810,117 | 5/1974 | Healey | 364/200 |
| 3,949,376 | 4/1976 | Ball | 364/200 |
| 3,949,379 | 4/1976 | Ball | 364/200 |
| 3,986,171 | 10/1976 | Spoelder | 364/200 |

Primary Examiner—James D. Thomas
Attorney, Agent, or Firm—Craig & Antonelli

[57] ABSTRACT

A data processing system has a main memory, a buffer memory, an instruction control unit, and an arithmetic unit. The data processing system also includes a register for storing an address for previous transfer and an adder for successively increasing the contents of the register to thereby transfer data in continuous regions of the main memory to the buffer memory when an instruction which causes the arithmetic unit to utilize the data is detected.

5 Claims, 5 Drawing Figures

DATA PROCESSING SYSTEM HAVING A HIGH SPEED BUFFER MEMORY

BACKGROUND OF THE INVENTION

1. Field of the Invention

The present invention relates to a data processing system having a high speed buffer memory.

2. Description of the Prior Art

In order to process instruction words at higher speed, data processing systems usually employ a high speed, small capacity buffer memory (cache memory).

In a prior art data processing system, data is transferred from a main memory to the high speed buffer memory only when there is a demand for data for an arithmetic unit.

In such a data processing system, since the processing by the arithmetic unit must "wait" during the period of data transfer, the processing ability of the arithmetic unit is reduced.

SUMMARY OF THE INVENTION

An object of the present invention is to provide a data processing system which makes it possible to increase the processing capability of the arithmetic unit which utilizes, successively, data in continuous regions of the main memory.

Another object of the present invention is to provide a data processing system which makes it possible to effectively utilize the high speed buffer memory.

In order to achieve such objects, the present invention is characterized by previously transferring the data in continuous regions of the main memory from the main memory to the high speed buffer memory when there is decoded an instruction word by which the arithmetic unit processes the data in continuous regions of the main memory.

These and other objects, features and advantages of the present invention will become more apparent from the following description when taken in connection with the accompanying drawings which show, for purposes of illustration only, several embodiments in accordance with the present invention.

DETAILED DESCRIPTION OF THE INVENTION

Figure 1:
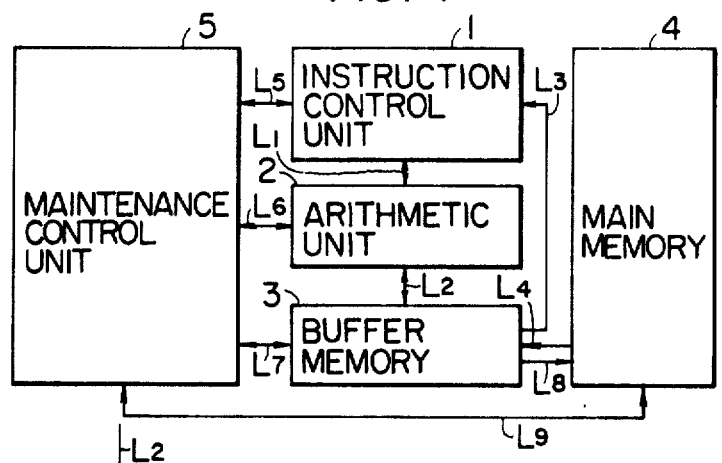
FIG. 1 is a block diagram showing an outline of a data processing system according to the present invention.

In FIG. 1 are shown an instruction control unit 1, an arithmetic unit 2, a high speed buffer memory 3, a main memory 4, a maintenance control unit 5, interconnected by signal lines L1 through L9.

Normally, an instruction word is transferred through the high speed buffer memory 3 from the main memory 4 to the instruction control unit 1 and is decoded by the instruction control unit 1. An operand address is also obtained by the instruction control unit 1. The decoded instruction word and the operand address are transferred to the arithmetic unit 2 by the arithmetic unit 2, and the operand is read out from the main memory 4 through the high speed buffer memory 3 in response to the operand address. Furthermore, the arithmetic operation of the instruction is executed by the arithmetic unit 2. The maintenance control unit 5 is provided for error processing.

These functions are the same as those in prior art data processing systems. According to the present invention, the following functions are performed.

When the instruction control unit 1 detects that an instruction to be executed corresponds to an instruction by which the arithmetic unit 2 successively utilizes the data in continuous addresses of the main memory 4, a prefetch request signal and the operand address are transferred through the arithmetic unit 2 to the buffer memory 3. A request signal for operand read-out is transferred from the buffer memory 3 to the main memory 4. At the same time, the operand address is transferred to the main memory 4.

An operand is read out from the main memory 4 and is transferred to the buffer memory 3. The operand is then stored in the buffer memory 3. An address successive to the operand address is transferred to the main memory 4 and the data corresponding to the address is read out from the main memory 4. These operations are repeated until the amount of data read out reaches a predetermined value.

In short, according to the present invention, when the data in the continuous addresses of the main memory 4 is to be utilized by the arithmetic unit 2, this data is previously transferred from the main memory 4 to the buffer memory 3. Therefore, the data required by the arithmetic unit 2 is quickly transferred from the buffer memory 3 to the arithmetic unit 2.

The circuitry for performing such functions is provided in the instruction control unit 1 and the high speed buffer memory 3. In the instruction control unit 1, there is provided a device for determining whether or not the arithmetic unit 2 utilizes the data in the continuous regions of the main memory. Such a determination is performed by examining the type of instruction word to be processed. Such an examination can be executed by utilizing a part of the decoder provided in the arithmetic unit 2. Since such a decoder can easily be constructed by one skilled in the art, a concrete construction thereof is not shown in the drawing for purposes of brevity.

Figure 2:
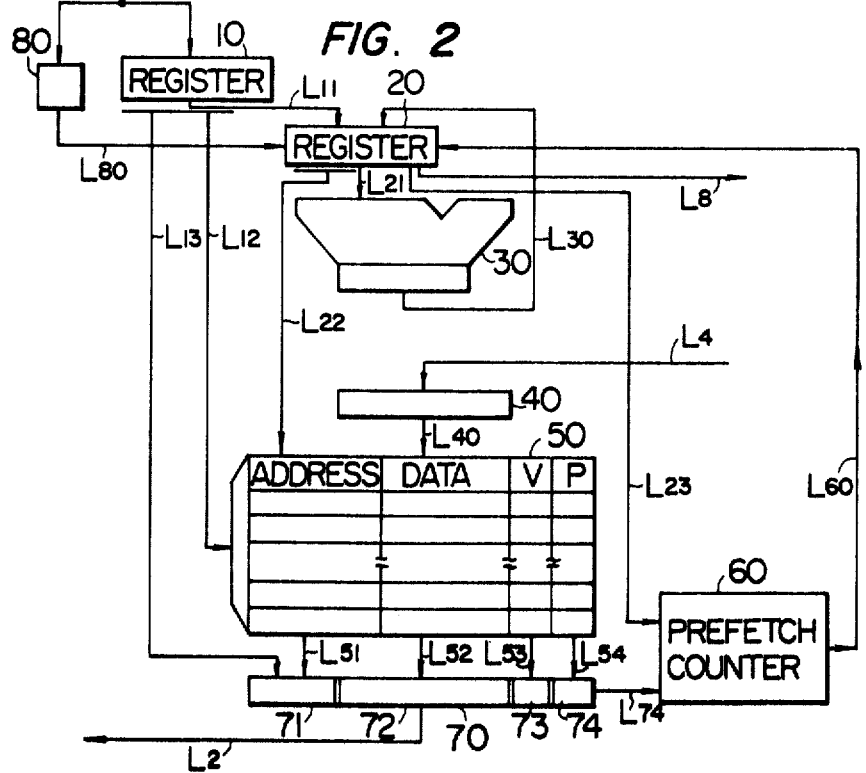
FIG. 2 is a diagram showing an embodiment of the fundamental construction of a main part of the data processing system shown in FIG. 1.

FIG. 2 shows a fundamental construction of an embodiment of the high speed buffer memory according to the present invention.

In FIG. 2, there are shown an address register 10 for temporarily storing an operand address from the arithmetic unit 2, an address register 20 for temporarily storing the operand address from the register 10 and for transferring the address to the main memory 4, an adder 30 for increasing the address of the register 20 by one and for transferring the increased result to the register 20, a data register 40 for temporarily storing the data from the main memory 4, a cache memory 50 comprising a multiplicity of columns, each of which includes addresses, data, validity bits V and prefetch bits P, a prefetch counter 60 for counting the number of addresses of the data which have been prefetched, a register 70 comprising portions 71, 72, 73 and 74 for storing the address, the data, the validity bit V and the prefetch bit P from the buffer memory portion 50, respectively and a register 80 for storing the prefetch mode.

Furthermore, L2, L4, L8, L11 to L13, L 21 to L 23, L 30, L40, L 51 to L54, L60, L 74 and L80 denote signal lines.

Figure 3:
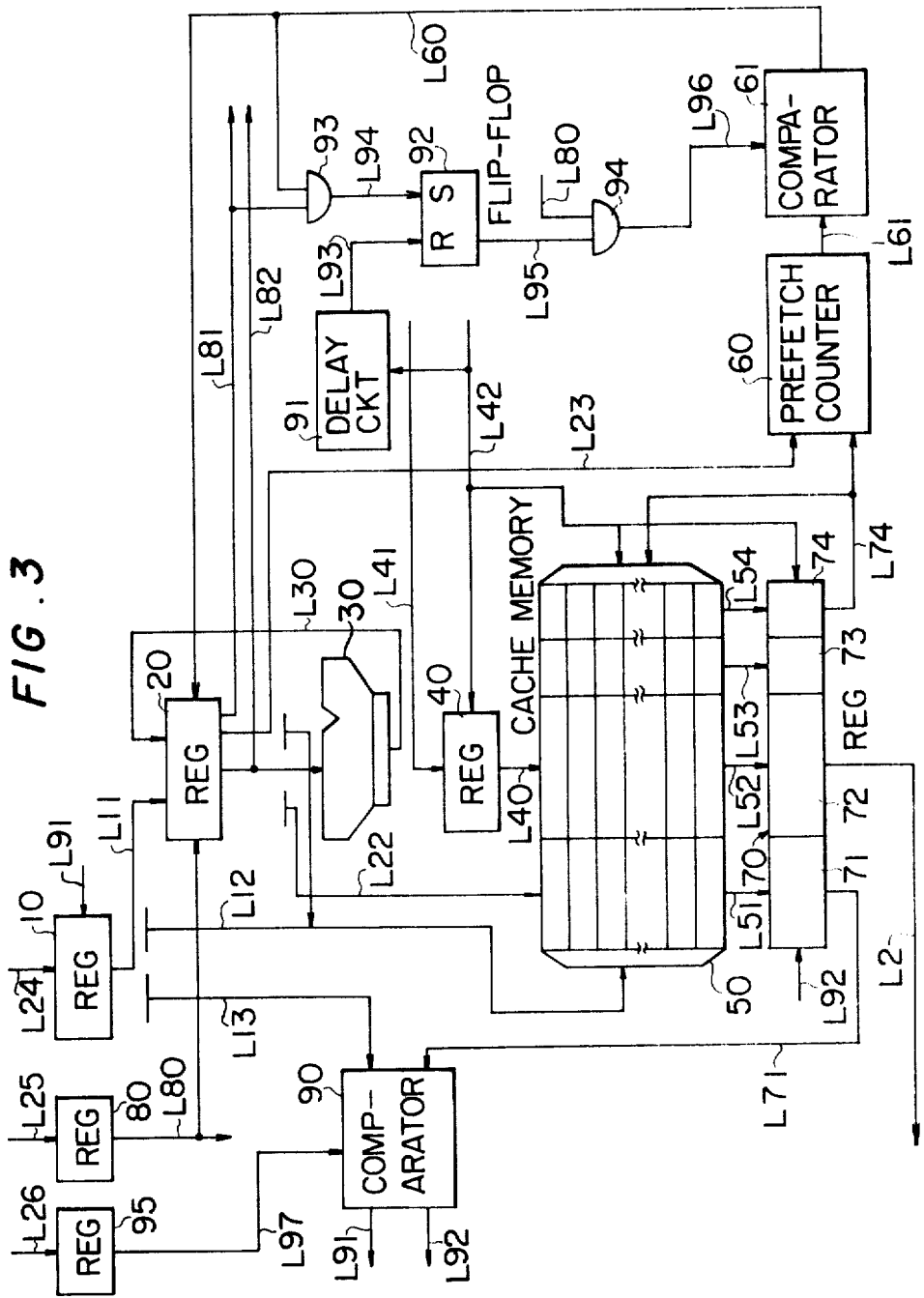
FIG. 3 is a diagram showing the further detailed construction of the system shown in FIG. 2.

FIG. 3 shows an example of further detailed construction of the high speed buffer memory shown in FIG. 2, which includes control circuits.

In FIG. 3 are shown a comparator 61 for determining whether or not the contents of the prefetch counter 60 exceed a predetermined value, a comparator 90 for determining whether or not the address in portion 71 of the register 70 coincides with the address in the register 10, a delay circuit 91, a flip-flop circuit 92, and OR circuit 93, and AND circuit 14, and a register 95 for storing a request signal for operand read-out.

Furthermore, there are shown a signal line L 24 for transferring the operand address from the arithmetic unit, a signal line L25 for transferring the prefetch request signal from the arithmetic unit, a signal line L26 for transferring the request signal for operand read-out from the arithmetic unit, signal lines L41 and L42 for transferring the data and a completion signal from the main memory, respectively, and signal lines L81 and L82 for transferring the request signal for read-out and the address to the main memory, respectively.

Figure 4:
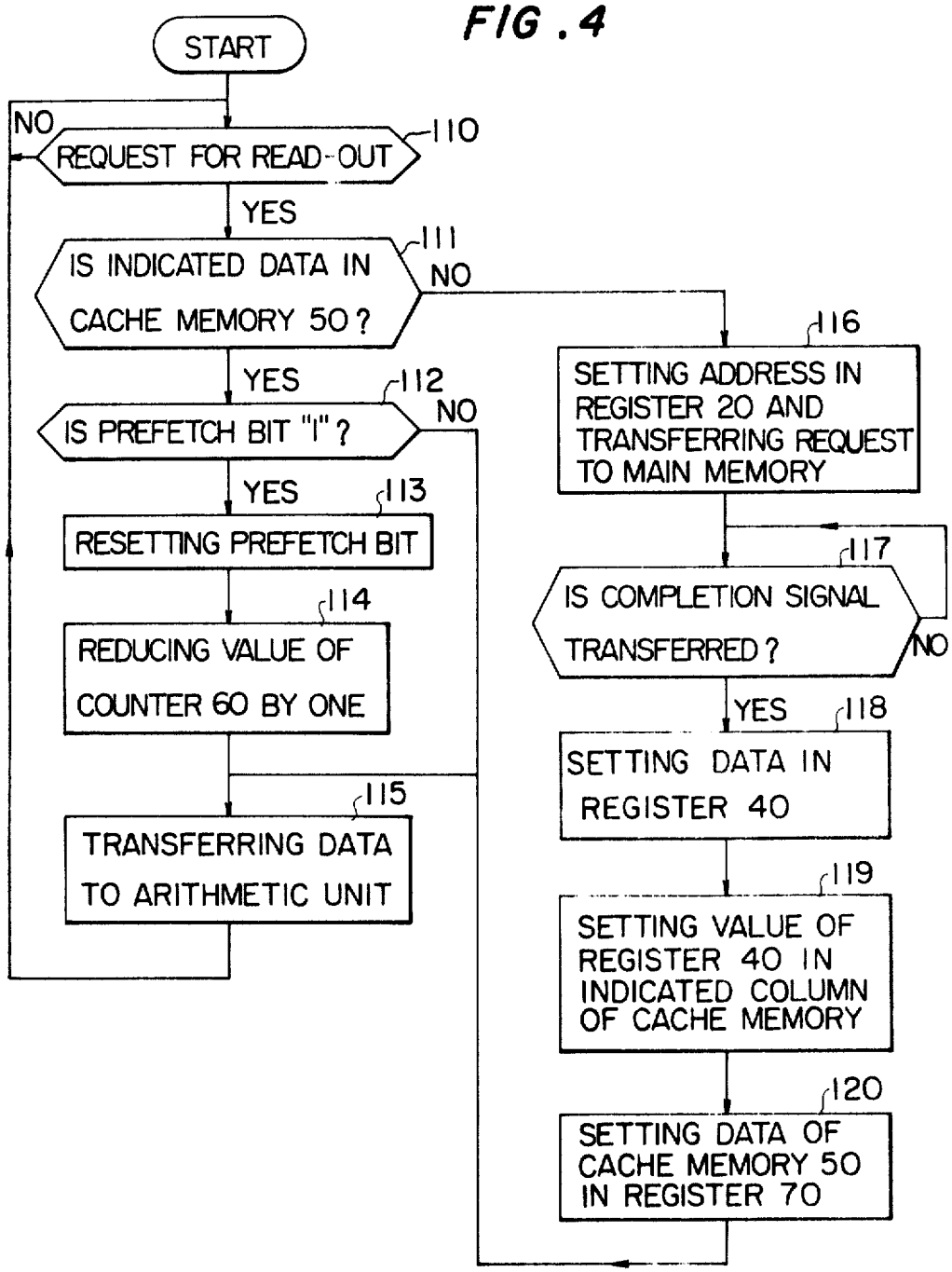
FIGS. 4 and 5 are flow charts for explaining the operation of the system shown in FIGS. 2 and 3.
Figure 5:
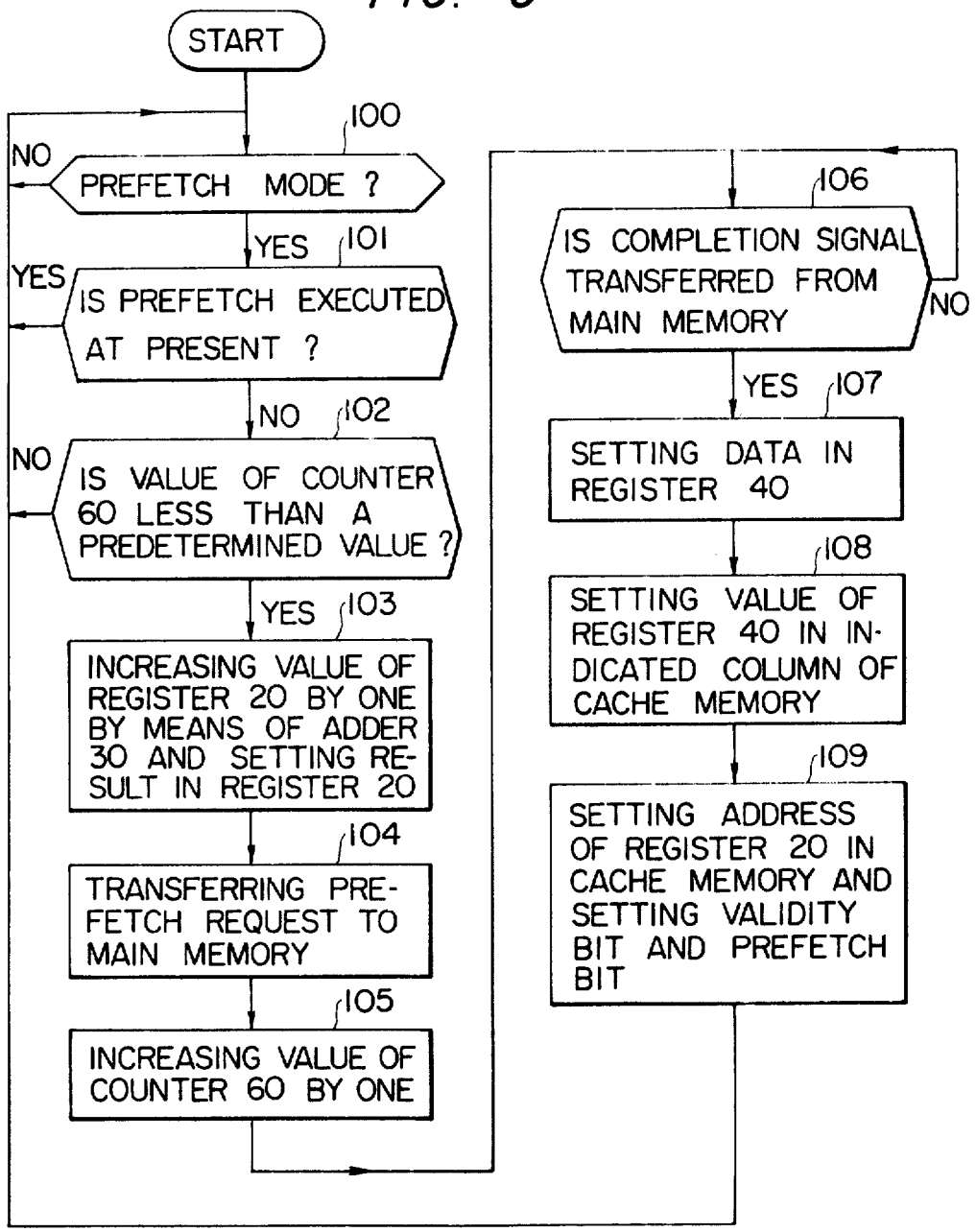

FIGS. 4 and 5 show flow charts for explaining the operations of a device shown in FIG. 3.

FIG. 4 shows the operations of this device after the request for an operand read-out.

As described above, it is determined from the type of the instruction to be executed whether or not the data in the continuous regions of the main memory is utilized as an operand by the arithmetic unit.

When an instruction by which the arithmetic unit utilizes the data in the continuous regions of the main memory is detected by the instruction control unit, a prefetch request signal and a request signal for operand read-out are transferred from the arithmetic unit to the registers 80 and 95 through signal lines L25 and L26, respectively. These signals are then set in the registers 80 and 95. At the same time, the operand address from the arithmetic unit is set in the address register 10 through signal line L24.

On the other hand, when a normal instruction is detected by the instruction control unit, the request signal for operand read-out and the operand address are set in the registers 95 and 10 through signal lines L26 and L24, respectively.

When the request for operand read-out is set in the register 95 (block 110 of FIG. 4), a part of the operand address of the register 10 is transferred through signal line L12 to the cache memory 50 as column information. The address, the data, the validity bit and the prefetch bit in the column indicated by the register 10 are successively read out through signal lines L51, L52, L53 and L54 to the portions 71, 72, 73 and 74 of the register 70, respectively. The address stored in the portion 71 of the register 70 is transferred through the signal line L71 to the comparator 90 and is compared with the address of the register 10. A signal is derived from signal line L92 or 91 in response to whether or not the address of the register 70 coincides with the address of the register 10. In other words, the comparator 90 examines whether or not the data of the address indicated by the register 10 is present in the cache memory 50 (block 111 of FIG. 4). A "1" or a "0" of the validity bit V represents whether the corresponding data is valid or invalid, respectively. Therefore, the data is valid only when the corresponding validity bits is "1". A "1" or a "0" of the prefetch bit represents whether or not the corresponding data is data read out by prefetch request. That is, a "1" for the prefetch bit represents that the corresponding data has been previously transferred from the main memory.

If the valid data is present in the cache memory 50 and the prefetch bit P is "1" (block 112 of FIG. 4), the prefetch bit is reset to "0" (block 113 of FIG. 4), at the same time, the contents of the prefetch counter 60 are reduced by one, (block 114 FIG. 4), according to a signal on the signal line L74. The data in the portion 72 of the register 70 is then transferred through the signal line L2 to the arithmetic unit (block 115 of FIG. 4).

When the data of the address indicated by the register 10 is not present in the cache memory 50, the address in the register 10 is transferred through the signal line L11 to the register 20 by a signal on the signal line L91. The request signal for read-out and the address are transferred from the register 20 to the main memory through the signal lines L81 and L82, respectively (block 116 of FIG. 4). When the corresponding data is read out from the main memory, a completion signal is transferred from the main memory to the signal line L42. When the completion signal is transferred from the main memory (block 117 of FIG. 4), the data read out from the main memory is transferred through the signal line L41 to the register 40 (block 118 of FIG. 4). This data as well as the address from the register 20 are stored in a column of the cache memory 50, indicated by the register 20 (block 119 of FIG. 4) and the corresponding validity bit V is set at "1". Furthermore, the data stored in the cache memory 50 is immediately set in the register 70 (block 120 of FIG. 4) and is then transferred through the signal line L2 to the arithmetic unit (block 115 of FIG. 4).

FIG. 5 shows a flow chart of the operations of a device shown in FIG. 3, in the prefetch mode.

When the prefetch mode is set in the register 80 (block 100 of FIG. 5), it is determined whether or not a previous transfer of the data has been executed at present (block 101 of FIG. 5).

This condition corresponds to a condition that the request signal for read-out is transferred to the main memory and the completion signal is not transferred from the main memory. Flip-flop circuit 92 is set by a signal on the signal line L94 and is reset by a signal on the signal line L93. The signal on the signal line L94 is obtained by the request signal on the signal line L81 and the signal on the signal line L93 is obtained by the completion signal on the signal line L42. Therefore, the set or reset condition of the flip-flop circuit 92 represents whether or not the previous transfer of the data has been executed. When the previous transfer of the data has not been executed, in other words, when the flip-flop 92 is reset, a signal is applied through the signal lines L95 and L96 to the comparator 61. Comparator 61 determines whether or not the contents of the prefetch counter 60 are less than a predetermined value (block 102 of FIG. 5).

When the value of the prefetch counter 60 is less than a predetermined value, a "1" signal is produced on the signal line L60. In response to this signal, the flip-flop circuit 92 is set at "1". At the same time, the contents of the register 20 are increased by one by the adder 30 and the thus obtained result is set in the register 20 (block 103 of FIG. 5). Furthermore, the contents of the register 20 and the request signal for read-out are transferred through the signal lines L82 and L81 to the main memory (block 104 of FIG. 5). The contents of the prefetch counter 60 are then increased by one by means of a signal on the signal line L23 (block 105 of FIG. 5).

When the completion signal is transferred through the signal line L42 from the main memory to the data register 40 (block 106 of FIG. 5), the data on the signal line L41 is stored in the data register 40 (block 107 of FIG. 5). The data in the register 40 is stored in a column of the cache memory 50, indicated by a signal from the register 20 (block 108 of FIG. 5). In like manner, the address in the register 20 is stored in this column. Furthermore, the corresponding validity bit and prefetch bit are set at "1" (block 109 of FIG. 5). After a period determined by the delay circuit 91, the flip-flop circuit 92 is reset. These operations are repeated until the contents of the prefetch counter 60 exceed a predetermined value.

According to the embodiment described above, it is possible to previously transfer the data utilized by the arithmetic unit from the main memory to the high speed buffer memory. Therefore, it is possible to increase the processing ability of the arithmetic unit.

For examples, it is presumed that the data transfer between the main memory and the buffer memory is executed at 32 byte - 8 cycles of time and the processing ability of the arithmetic unit is 4 bytes per one cycle of time.

In order to process 96 bytes of data in the continuous regions of the main memory, the prior art system requires 48 cycle times corresponding to 24 cycle times for the arithmetic operation plus 24 cycle times for data transfer, while the system according to the present invention requires 32 cycle times corresponding to 24 cycle times for the arithmetic operation plus the 8 cycle times for data transfer because, during the arithmetic operation for the data of 32 byte transferred from the main memory, the successive data of 32 bytes is transferred from the main memory.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. In a data processing system having:
    a main memory for storing data which includes instruction words and operands;
    a buffer memory, coupled to said main memory, for storing, by way of data transfer from said main memory, part of the data stored in said main memory;
    an instruction control unit, coupled to said buffer memory, for decoding instruction words read out of said buffer memory and for obtaining operand addresses; and
    an arithmetic unit, coupled to said instruction control unit and said buffer memory, for processing instruction words decoded by said instruction control unit in response to operands read out from said buffer memory in accordance with operand addresses from said instruction control unit;
    the improvement comprising:
    first means, including said instruction control unit, for detecting that an instruction word read out from said buffer memory corresponds to a prescribed type of instruction in accordance with which said arithmetic unit successively utilizes a sequence of operands which are stored in successive regions of said main memory; and
    second means, coupled to said main memory, said buffer memory, said instruction control unit, and said first means, for successively causing each operand in said sequence of operands to be transferred from said main memory to said buffer memory in accordance with an operand address from said instruction control unit, in response to said first means detecting said prescribed type of instruction.

2. The improvement according to claim 1, wherein said second means includes
    first register means, coupled to instruction control unit, for storing an operand address provided thereby,
    adder means, coupled to said first register means, for controllably and successively increasing the contents of said first register means, and
    means, coupled to said first register means, for causing data stored at the address in said main memory, identified by the operand address in said first register means, to be transferred from said main memory to said buffer memory.

3. The improvement according to claim 2, wherein said second means further includes read-out means, coupled to said buffer memory and said arithmetic unit, for causing data stored in said buffer memory to be transferred to said arithmetic unit.

4. The improvement according to claim 2, wherein said second means further includes means, coupled to said transfer causing means, for rendering said transfer causing means operative only when the number of operands in said sequence of operands which have been transferred from said main memory to said buffer memory is less than a predetermined value.

5. The improvement according to claim 4, wherein said second means further includes
    means, coupled to said instruction control unit, for storing a prefetch mode request for transferring said sequence of operands in response to the detecting operation of said first means,
    means, coupled to said main memory and said buffer memory, for detecting the occurrence of the execution of data transfer from said main memory to said buffer memory, and
    means, coupled to said prefetch mode request storing means and said occurrence detecting means, for controlling said rendering means in response thereto.

* * * * *